2,695,824

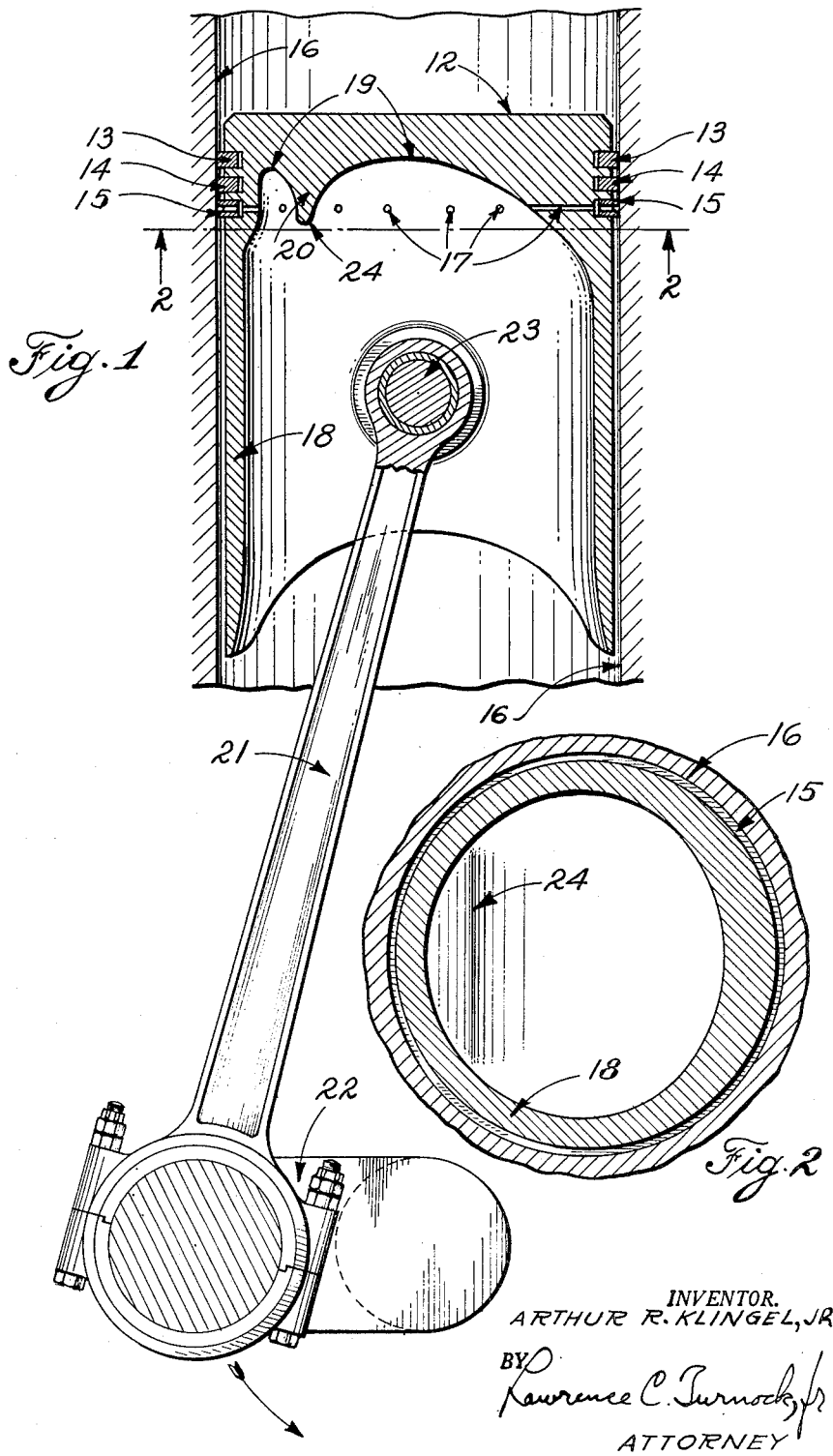

PISTON CONSTRUCTION

Arthur R. Klingel, Jr., Chagrin Falls, Ohio, assignor to The Standard Oil Company, Cleveland, Ohio, a corporation of Ohio Application July 2, 1952, Serial No. 296,818

6 Claims. (Cl. 309—8)

This invention relates to pistons for internal combustion engines and more particularly to a novel piston construction which effectively reduces oil consumption by the engine.

Most of the oil consumed in the operation of an internal combustion engine leaves by way of the exhaust. It reaches the exhaust line by passing up the cylinder walls past the pistons and piston rings and into the combustion chambers. It is then forced out of the combustion chambers with the exhaust gases. Piston rings are not only designed to maintain compression within the combustion chamber, but also to reduce oil consumption by wiping excess oil from the cylinder wall during the down stroke. As the piston ring travels downward, the piston ring grooves are flooded with excess oil and the oil pressure in the groove increases rapidly. Oil consumption increases as this pressure increases. To relieve this pressure and therefore cut down on the amount of oil which passes into the combustion chamber, the piston skirt is sometimes perforated at the lower ring groove with a series of small holes or slots evenly spaced around the circumference of the groove. Excess oil passes from the ring groove through these holes and onto both the crown and skirt (as used herein these terms refer to the inner top and side surfaces of the piston respectively).

The lower piston ring may also be perforated in a similar manner in order to provide easier access for the oil to the groove holes.

It has been found that the oil which is wiped from the cylinder wall and which passes to the crown and skirt flows down the skirt and back onto the cylinder wall. Thus, the oil returns directly to the very place from which it is removed, namely to the cylinder wall.

In accordance with my invention the amount of oil which flows directly from the skirt to the cylinder wall, and therefore the amount of oil on the wall, is reduced. This is accomplished by a promontory extending from a substantially concave shaped crown. The term "concave shaped" is intended to be broad enough to include irregularities in the crown occasioned by requirements for structural strength and proper distribution of weight. The oil thrown from the promontory will reach the cylinder walls after first passing to the sump. Regardless of the exact position of the promontory, it can be seen that a portion of the oil which passes through the groove holes will always be diverted from its usual direct passage to the cylinder wall.

The ultimate advantage of my invention is the reduced oil consumption resulting from its use. With less oil on the cylinder wall, the oil pressure around the piston rings will be lower, and less oil will be forced past the rings into the combustion chamber.

In the preferred embodiment of the invention, the promontory is located away from central area of the crown so that oil thrown therefrom during the downstroke of the piston is free to travel directly to the sump.

The operation and advantages of my invention will be more evident from the description which follows, read in connection with the accompanying drawings which are illustrative and where:

Figure 1 is a side view of a section of a cylinder with an associated piston, connecting rod, and crankshaft; and Figure 2 shows a section of the cylinder of Figure 1 through the line 2—2.

The novel piston shown in Figure 1 has a substantially concave shaped crown. Its skirt 18 is perforated by a series of evenly spaced holes or slots 17 through its lower piston ring 15 groove. The novel feature of the piston is the promontory 20 which depends from the substantially concave shaped crown. Its location, shape, and size are influenced by several factors. It can be located anywhere on the crown but preferably in that segment (a) whose vertical projection would not be intersected by the wrist pin 23 and (b) which is over the crank throw 22 when the latter is traveling away, substantially as shown in Figure 1. Sides which gently slope into the recesses 19 are preferred. In this way the recess 19, i. e., the peaks of the crown, will be displaced further from the promontory, thereby increasing the proportion of oil on the inner surfaces of the piston which will preferentially flow onto the promontory. Thus, the base of the promontory ought to be substantially wider than the ridge 24. The ridge may vary in length and may either be straight or curved. Preferably however, its length and curvature should not cause it to extend beyond the crown segment mentioned above. The height of the promontory may preferably range from about ⅛″ to 2″ depending on the diameter of the piston. This height is limited by the need for structural rigidity and the fact that its weight must be counterbalanced by a correspondingly thicker crown on the opposite side of the piston.

Figure 2 is an end view of the piston shown in Figure 1 along the axis 2—2. The ridge 24 is straight and does not quite touch the skirt 18 at each end. Otherwise some of the oil on the promontory would be thrown back on the skirt.

The utility of the invention may be explained by referring back to Figure 1. As the piston 12 travels downward, the skirt and piston ring grooves are flooded with oil during this period, and the pressure increase is particularly large in the lower groove. In order to reduce this lower piston ring groove oil pressure the piston skirt may be perforated with a series of holes 17 or slots evenly spaced around the circumference. For example, the holes may be spaced one-half inch apart. Thus, on the down-stroke oil will pass into the groove of piston rings 15, through the holes 17 and onto the inside piston skirt 18.

As the piston is decelerating during the last half of the upstroke and accelerating during the first half of the down-stroke, oil on the skirt 18 will tend to collect in the crown recesses 19. During the last half of the down-stroke the oil will leave the recesses and a portion will flow onto the promontory 20. Somewhere near the bottom of the down-stroke, said portion will be thrown downward toward the crankcase at a high velocity. It is believed that the oil is thrown from the promontory 20 when the crank throw 22 is at an angle of between 20° and 10° from the bottom of the stroke.

If the promontory 20 is in its preferred position, that is, so located that it is directly over the connecting rod 21 and crank throw 22 during the down-stroke, the oil thrown from the promontory will have an unobstructed path to the sump. By the time the oil reaches the level of the crank throw 22 on its downward flight the crank throw will have passed through the bottom of its swing.

For the purposes of this invention the position of the promontory is not restricted to any particular segment of the crown, as long as it operates to divert some oil from the cylinder wall. Thus, even if the oil thrown from the promontory strikes the wrist pin 23, connecting rod 21, and/or the crank throw 22 some of it will not thereafter be splashed directly to the cylinder walls.

From the foregoing it will be apparent that the present invention provides a novel piston construction which operates effectively to reduce oil consumption in an internal combustion engine by guiding oil from the inner surface of the piston directly to the sump.

It is to be understood that many changes and alterations will occur to those skilled in the art upon reading the present description. For example, it is not necessary that the piston skirt be perforated. Oil wiped from the cylinder wall by the lower edge of the skirt will flow in the same manner as that which flows through the perforations. As another example, the crown may consist of a series of steps rather than a smooth continuous slope. All such changes and modifications are intended to come within the scope of the present invention as defined in the appended claims.

I claim:
1. In an internal combustion engine piston whose crown is substantially concave in shape, the improvement which comprises a promontory depending from said crown.
2. The improvement of claim 1 wherein the promontory extends from an area of the crown located substantially midway between said skirt an that diameter of the crown which is parallel to the wrist pin axis.
3. The improvement of claim 2 wherein the promontory is located on the same side of the wrist pin axis as the connecting rod during the down-stroke.
4. In an internal combustion engine piston whose skirt is perforated by a series of small holes around the lower ring groove and whose crown is substantially concave in shape, the improvement which comprises a promontory depending from said crown.
5. The improvement of claim 4 wherein the promontory extends from an area of the crown located substantially midway between said skirt and that diameter of the crown which is parallel to the wrist pin axis.
6. The improvement of claim 5 wherein the promontory is located on the same side of the wrist pin axis as the connecting rod during the downstroke.

References Cited in the file of this patent

UNITED STATES PATENTS

| Number | Name | Date |
|---|---|---|
| 1,259,292 | Riedler | Mar. 12, 1918 |
| 2,092,599 | Brill | Sept. 7, 1937 |
| 2,243,263 | Starr | May 27, 1941 |
| 2,408,875 | Parkins | Oct. 8, 1946 |

FOREIGN PATENTS

| Number | Country | Date |
|---|---|---|
| 3,632 | Great Britain | July 30, 1908 |